Figure 1:
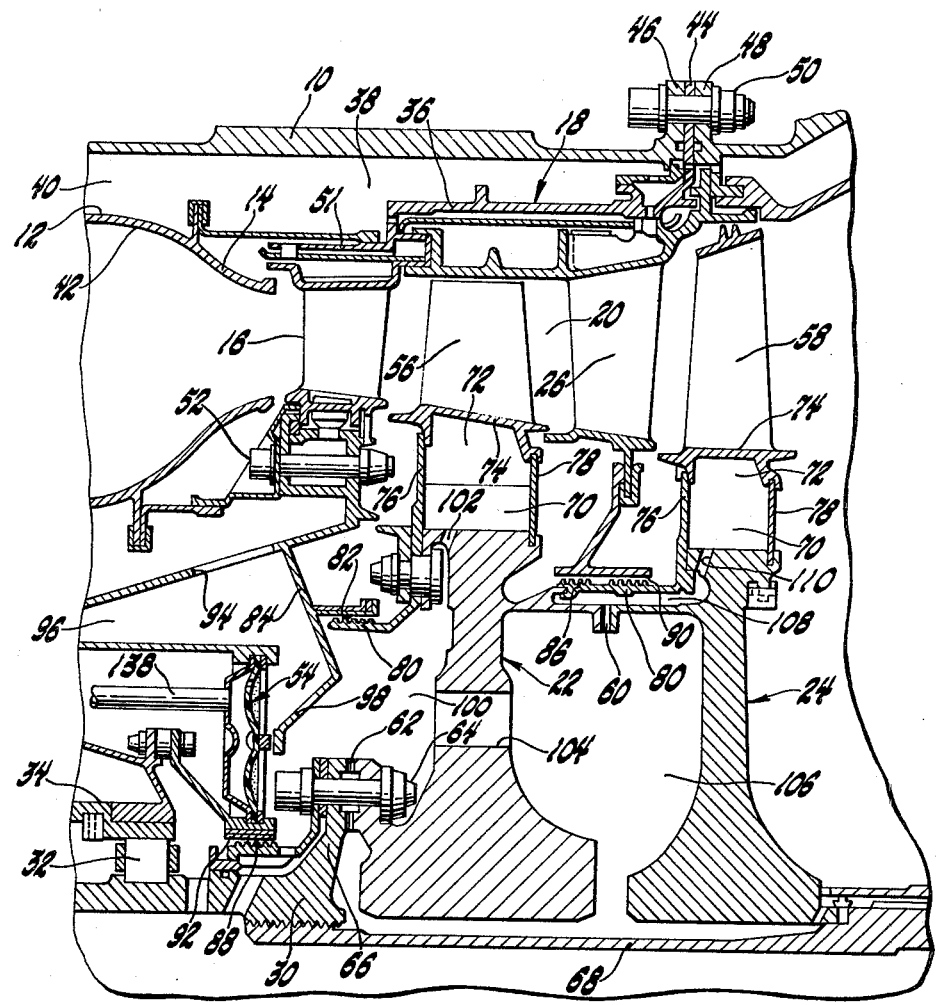

United States Patent [19]

Williams

[11] 4,213,738
[45] Jul. 22, 1980

[54] COOLING AIR CONTROL VALVE

[75] Inventor: James R. Williams, Martinsville, Ind.

[73] Assignee: General Motors Corporation, Detroit, Mich.

[21] Appl. No.: 879,782

[22] Filed: Feb. 21, 1978

[51] Int. Cl.$^2$ .................. F01D 5/08; F01D 5/18
[52] U.S. Cl. ........................... 416/95; 415/115
[58] Field of Search .............. 415/115, 116, 175; 416/95, 96-97

[56] References Cited

U.S. PATENT DOCUMENTS

| | | | |
|---|---|---|---|
| 2,598,176 | 5/1952 | Johnstone | 416/95 X |
| 2,951,340 | 9/1960 | Howald | 416/95 X |
| 3,452,542 | 7/1969 | Saferstein et al. | 415/115 X |
| 3,515,206 | 6/1970 | Ward et al. | 416/95 X |
| 3,575,528 | 4/1971 | Beam et al. | 416/95 X |
| 3,632,221 | 1/1972 | Uehling | 415/115 |
| 3,712,756 | 1/1973 | Kalikow et al. | 416/95 X |
| 3,736,069 | 5/1973 | Beam et al. | 416/95 X |
| 4,019,320 | 4/1977 | Redinger et al. | 415/116 X |

FOREIGN PATENT DOCUMENTS

| | | | |
|---|---|---|---|
| 1059718 | 6/1959 | Fed. Rep. of Germany | 416/95 |
| 46-43565 | 12/1971 | Japan | 416/95 |
| 877127 | 9/1961 | United Kingdom | 416/95 |

Primary Examiner—Everette A. Powell, Jr.
Attorney, Agent, or Firm—J. C. Evans

[57] ABSTRACT

An air cooled gas turbine engine includes a cooling flow valve for regulating cooling air flow to a turbine rotor in accordance with compressor discharge pressure and the operating temperature of the turbine component by means of a pressurizable diaphragm carrying a movable valve element with respect to a fixed valve seat and wherein means are associated with the diaphragm to define a pressurizable internal cavity communicated with compressor discharge pressure by means of a control orifice to bias the diaphragm and valve element into a closed position when the compressor discharge pressure is at engine cruise condition and wherein as the temperature of operating turbine blades increase means are provided to sense such temperature increase and to bleed air from the pressurizable chamber thereby to cause the movable valve element to cycle with respect to the fixed valve seat so as to modulate coolant flow to the turbine in a manner to maintain optimized engine power output along with improved fuel consumption characteristics.

2 Claims, 2 Drawing Figures

COOLING AIR CONTROL VALVE

This invention relates to cooling of turbine rotors and more particularly to an improved flow control means to regulate the flow of cooling fluid such as compressor discharge air to wheels and blades of a gas turbine engine.

High performance gas turbine engines for use in aircraft and industrial gas turbine application depend upon increases in turbine inlet temperature to produce desired power performance and fuel economy characteristics.

At such operating temperatures turbine components, desirably, are cooled by a coolant such as compressor discharge air. For example, the turbine rotor and blade components of the gas turbine engine are so cooled, to maintain them at a temperature less than that of the increased operating temperature conditions.

One arrangement for accomplishing this purpose is set forth in U.S. Pat. No. 3,575,528 issued Apr. 20, 1971 to Beam Jr., wherein compressor discharge air is directed into the rotating wheel and blade components of a gas turbine engine under the control of thermally responsive bimetal valves for increasing flow of turbine cooling air to the wheel and blade components as their temperature increases.

An object of the present invention is to provide an improved flow regulator device which will reduce flow of coolant air flow to wheels and blade components of a gas turbine engine under engine cruise conditions and wherein the device includes a movable valve element formed as part of a pressurizable, diaphragm operated actuator which has compressor discharge pressure directed through the diaphragm to maintain the valve element in a closed position and wherein means are provided to sense the operating temperature of a blade component of the turbine to bleed compressor discharge pressure from the regulator device so as to reduce the level of compressor discharge pressure on one side of the diaphragm so that the same pressure on the opposite side thereof will quickly move the valve element into an open position to modulate cooling air flow to the wheel and blade components of the gas turbine engine so as to reduce compressor discharge flow in the coolant system and maximize power output from the engine under engine cruise conditions thereby to maximize standard fuel consumption of the engine while maintaining optimal cooling of the blade and wheel components of the turbine.

Further objects and advantages of the present invention will be apparent from the following description, reference being had to the accompanying drawings wherein a preferred embodiment of the present invention is clearly shown.

Figure 2:
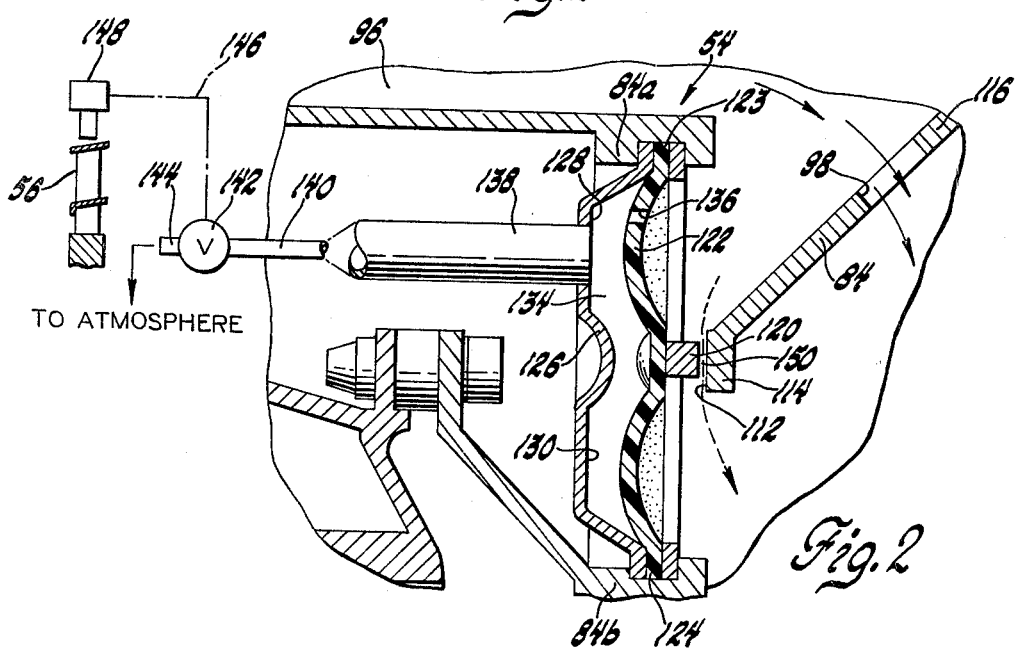

FIG. 1 is a sectional view of a two-stage, high temperature gas turbine taken on a plane containing the axis of rotation of the turbine; and FIG. 2 is an enlarged fragmentary vertical sectional view of a flow regulator device in FIG. 1.

Referring to the drawing, FIG. 1 shows a high temperature turbine suitable for association with the present invention, it being understood that the coolant flow regulator of the present invention is suitable for use in other gas turbine engine environments.

In the illustrated arrangement, the turbine of FIG. 1 includes an outer case 10 that is in surrounding relationship to an annular gas turbine combustor 12 having an outlet transition 14 that discharges hot gases across a ring of turbine nozzle vanes 16 for discharge to a downstream section 18 that includes an annular discharge passage 20 of axial divergent form to accommodate turbine wheels 22, 24. A ring of turbine stator blades 26 is supported by the downstream section 18 intermediate the turbine wheels 22, 24. The motive fluid from the ring of turbine nozzle vanes 16 passes in sequence through the turbine wheel 22 thence through the stator blades 26 and the downstream turbine wheel 24 for discharge.

The turbine wheels 22, 24 are interconnected to one another and in turn are connected to a drive shaft 30 coupled to a low pressure fan at the inlet of the gas turbine engine. More particularly, in the illustrated arrangement the shaft is supported by a roller bearing 32 mounted in a support 34.

The aforedescribed details of a gas turbine engine are merely representative of any hot running gas turbine engine system that includes rotary components therein that are subjected to gas turbine operating temperatures elevated to a point where the materials of the rotary component are cooled to maintain mechanical strength under the conditions of engine operation.

The coolant compartment in the illustrated engine includes a turbine case of double wall construction including an inner cylindrical wall 36 located radially outboard of the stator blade ring 26. The cylinder wall 36 and outer case 10 define an annular passage 38 for turbine stator cooling air. In the illustrated arrangement the passage 38 can be a continuation of the jacket space or passage 40 between the combustion liner 42 and the outer case 10.

The wall 36 has an aft radial flange 44 that is held between a flange 46 on the outer case and a flange 48 on the downstream wall section 18 by a ring of connector bolts 50 directed through the aligned parts. The forward end of the inner wall 36 includes a segment 51 thereon that provides the outer support for the ring of turbine nozzle vanes 16. The inboard margin of the ring of turbine nozzle vanes 16 in turn is secured by a ring of connector bolts 52 to the outlet transition 14 from the combustor.

Flow of coolant air to the turbine wheels 22, 24 is under the control of an air cooling flow regulator assembly 54.

The turbine wheels 22, 24 have a ring of blades 56, 58, respectively, having flanges with side edges thereon connected by a spline connector 60. Turbine wheel 22 is connected by a spline connector 62 and cooperating connector bolt assembly 64 to a flange 66 of shaft 30 and turbine wheel 24 is held to the flange 66 by a cone shaft 68 forming part of the drive shaft 30 of the assembly. Each of the individual blades of each of the rings of blades 56, 58 includes a blade root 70, blade stalks 72 and blade platform 74. Front and rear seal plates 76, 78, respectively, close off the gap between the turbine wheel and blade platform thereby to prevent axial flow of motive fluid across the turbine wheels 22, 24 other than through the ring of blades 56, 58 thereon. It is recognized that such turbine structure is well known and is representative of components desirably cooled by the present invention. The inner margin of the seal plate 76 on wheel 22 includes an axial extension or inner member 80 of a labyrinth seal cooperating with a sealing surface 82 on the engine inner wall 84. Additional labyrinth seals 86, 88 and surfaces 90 and 92, respectively, seal other segments of the turbine wheels 22, 24 and the fixed structure of the engine.

An opening or openings 94 in the inner wall 84 defines an entrance to wall space 96 for compressor discharge air or combustion chamber jacket air to the rotary parts of the turbine for cooling turbine wheels 22 and 24. Some of the cooling air supplied to the aforesaid space 96 flows air through port 98 in the wall 84 thence into a cooling air chamber 100 at the inboard face of the turbine wheel 22. Coolant is directed from the cooling air chamber 100 through holes 102 in the rim of the turbine wheel 22 thence through individual ones of the blades 56 for cooling the outer surface thereof.

Representative air cooled blades suitable for use with the present invention are set forth in U.S. Pat. No. 3,619,082 issued Nov. 9, 1971 to George P. Meginnis and U.S. Pat. No. 3,698,834 issued Oct. 17, 1971 to George P. Meginnis.

Cooling air for the turbine wheel 24 is directed through openings 104 in the wheel 22 into a space 106 between the wheel 22 and 24. Coolant flow from the interwheel space 106 flows through clearances in the spline connector 60, thence into an air chamber 108 for flow through ports 110 in the rim of the wheel 24. The coolant flow through the rim holes 110 is directed through the ring of blades 58 for cooling the component parts thereof.

The coolant flow regulator valve assembly 54 is associated with the aforesaid structure and includes improved components to maximize efficiency of coolant flow without detracting from power performance of the engine. More particularly, the flow regulator assembly 54, best shown in FIG. 2 is arranged to positively reduce flow of coolant from the cooling air chamber 96 to the wheels 22, 24 and includes unique components to produce a modulated flow of coolant flow in accordance with the temperature of the ring of blades 56 or the ring of blades 58 to maintain them at an optimized temperature for maintenance of mechanical strength without excessive bleed of compressed air from the main gas flow passages of the gas turbine engine.

Referring now more particularly to FIG. 2, the regulator assembly 54 includes a fixed valve seat 112 formed on the inboard surface of the annular tip 114 on a radially inwardly directed extension 116 of the engine inner wall 84.

The extension 116 includes a port 98 sized to maintain a minimum coolant flow across the ring of blades 56, 58, when the regulator valve assembly 54 is in its closed position.

When in the closed position, the fixed valve seat 112 is in engagement with a movable annular valve element 120 fixedly secured to the apex of an annular diaphragm member 122 having peripheral beads 123, 124 thereon sealingly connected to spaced segments 84a and 84b of the inner wall 84. The flexible diaphragm 122 is spaced with respect to a rigid wall 128 having corrugations 130 and a raised stop portion 126 therein to define a pressurizable chamber 134 with the diaphragm 122. The stop 126 limits travel of the diaphragm member 122 to prevent over-stressing thereof. The pressurizable chamber 134 is communicated with compressor discharge pressure when the valve is closed through a control orifice 136 in the diaphragm 122. Orifice 136 will maintain balanced compressor discharge pressure across diaphragm 122 under steady state conditions during low power operation. Under such conditions, an inherent spring force bias in the diaphragm 122 will resiliently maintain the movable valve element 120 in its closed position against valve seat 112.

In order to modulate flow of coolant through the regulator valve assembly 54, the pressurizable chamber 134 has an outlet fitting 138 secured thereto connected to a bleed tube 140 having an electromagnetically operated control valve 142 therein within exhaust port 144 to atmosphere. The control valve is connected to a signal line 146 that receives a signal from an infra-red pyrometer 148 that is located in line-of-sight relationship with the ring of blades 56, 58 and is responsive to temperature increases therein to produce a signal on the control valve 26 to selectively regulate the valve to bleed compressor discharge pressure from the pressurizable chamber 134 so as to reduce the pressure therein from the steady state compressor discharge pressure levels to cause a pressure differential across the flexible diaphragm 122. The resultant pressure differential controls the gap between the valve element 120 and the valve seat 112. The degree of bleed from the pressurizable chamber 134 to atmosphere will establish a modulated flow of coolant flow through gap 150 thence through the aforedescribed coolant paths to the ring of blades 56, 58 so as to maintain them at an optimized temperature level during operation of the gas turbine engine. Moreover, the aforesaid selective bleed of compressor discharge flow will tailor the flow of required coolant from the compressor discharge flow so as to minimize bypass of compressed air from the main gas flow passages of the gas turbine engine.

For performance comparison of the turbine operating temperature, coolant flow and power level of a gas turbine engine including the improved regulator valve assembly of the present invention reference can be had to the following listed chart which shows improved standard fuel consumption by use of the improved regulator valve assembly of the present invention.

| PERFORMANCE COMPARISON | | |
| --- | --- | --- |
| TURBINE TEMPERATURE | TAKEOFF | LOW POWER |
| WITH COOLING VALVE | 2750° F. | 2165° F. |
| WITHOUT COOLING VALVE | 2750° F. | 2165° F. |
| COOLING FLOW | | |
| WITH VALVE | 12.7% | 9.4% |
| WITHOUT VALVE | 12.7% | 12.7% |
| POWER | | |
| WITH VALVE | 19,100 | 11,900 |
| WITHOUT VALVE | 19,100 | 11,700 |
| SFC | | |
| WITH VALVE | — | .37 |
| WITHOUT VALVE | — | .39 |

The foredescribed improved coolant flow regulator valve assembly 54 is readily adaptable for connection in existing gas turbine engines with slight modification of inner wall components thereof. Furthermore, it is immediately responsive to compressor discharge pressure and will maintain minimal coolant bypass from the gas turbine engine when there is no need for coolant flow through the operating component of the gas turbine engine at engine cruise conditions. However, as transient temperature increases occur in the operating components of the gas turbine engine, immediate compensation for such increases is produced by directly sensing the temperature of the components and adjusting the pressure differential across the movable diaphragm component of the system to produce an increase in coolant flow without delay and in a manner to maintain minimal bypass of coolant from the main gas flow passages of the gas turbine engine.

While the embodiments of the present invention, as herein disclosed, constitute a preferred form, it is to be understood that other forms might be adopted.

The embodiments of the invention in which an exclusive property or privilege is claimed are defined as follows:

1. A turbine cooling system for use in gas turbine engines having a coolant fluid supply source therein comprising: a turbine component mounted within the engine, means for forming a space internally of said engine having pressurized coolant fluid therein, flow regulator means for conducting coolant fluid from said space to said turbine component including a fixed valve seat, means including a spring biased valve element for defining a pressurizable internal cavity within said flow regulator means, said spring biased valve element being exposed to said space internally of said engine and having the pressurized coolant fluid therein acting thereon, means for continuously directing pressurized coolant fluid from said space into said pressurizable internal cavity to produce a balanced fluid pressure across said valve element wherein only the spring bias thereof is utilized to maintain the valve element in a closed position against the fixed valve seat during engine cruise operation, and sensor means directly sensing the temperature of said turbine component and operable to bleed the continuously applied pressurized coolant fluid from said internal cavity directly in response to the temperature of said turbine component whereby pressure of the coolant fluid in said engine space acts against the spring bias of said valve element to open it to direct increased coolant flow from said space to said turbine component under engine cruise conditions, said sensor means being operative upon cooling of the turbine component to prevent bleed of the continuously applied pressurized coolant fluid from said internal cavity to cause the balanced pressures across said valve element to cause its spring bias to return it to its closed position to reduce the amount of coolant flow from said space within said engine.

2. A turbine cooling system for use in gas turbine engines having a coolant fluid supply source therein comprising: a turbine wheel mounted for rotation about an axis, flow regulator means for conducting coolant fluid to said turbine wheel including a fixed valve seat and a pressurizable cavity therein, means forming a space internally of the engine having a pressurized source of coolant fluid therein, a spring biased valve element forming part of said space and part of said internal cavity of said flow regulator means and being movable in response to the spring bias therein toward a closed position against said valve seat to block coolant flow to said turbine wheel, means for continuously directing pressurized coolant fluid from said space into said internal cavity for balancing the fluid pressure across said spring biased valve element to cause the spring bias on said valve element to maintain it in its closed position, control means for bleeding said cavity to cause said spring biased valve to cycle open and closed directly in response to the temperature of said turbine wheel thereby to cause control flow of coolant fluid from said space to vary coolant across said turbine wheel to reduce the temperature thereof, said control means including an infra-red temperature sensor in direct line of sight relationship with said turbine wheel for controlling bleed from the internal cavity of the flow regulator means in accordance therewith.

* * * * *